(12) United States Patent
Åsen et al.

(10) Patent No.: US 6,395,243 B1
(45) Date of Patent: May 28, 2002

(54) CATALYTIC OR NON-CATALYTIC PROCESSES WITH ENRICHED OXYGEN AS A REACTANT

(75) Inventors: Knut Ingvar Åsen, Heistad; Stein Julsrud, Skien, both of (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/445,302

(22) PCT Filed: Jul. 2, 1997

(86) PCT No.: PCT/NO97/00170

§ 371 (c)(1),
(2), (4) Date: Jan. 21, 2000

(87) PCT Pub. No.: WO98/55393

PCT Pub. Date: Dec. 10, 1998

(30) Foreign Application Priority Data

Jun. 6, 1997 (NO) .................................................. 972630

(51) Int. Cl.⁷ ............................................... C01B 21/00
(52) U.S. Cl. ...................... 423/219; 423/351; 423/359; 423/393; 423/400; 423/651; 423/392; 423/659; 252/373; 252/376
(58) Field of Search ................................ 423/219, 359, 423/390.1, 392, 651, 351, 393, 400, 659; 252/373, 376

(56) References Cited

U.S. PATENT DOCUMENTS

| | | | |
|---|---|---|---|
| 3,927,182 A | 12/1975 | Powell | 423/392 |
| 4,198,379 A * | 4/1980 | James | 423/239 |
| 4,542,010 A * | 9/1985 | Roman et al. | 423/579 |
| 5,035,726 A | 7/1991 | Chen et al. | 55/16 |
| 5,160,713 A | 11/1992 | Mazanec et al. | 423/210 |
| 5,245,110 A | 9/1993 | Van Dijk et al. | 585/946 |
| 5,736,116 A * | 4/1998 | LeBlanc et al. | 423/359 |
| 5,925,328 A * | 7/1999 | Stahl et al. | 423/650 |
| 5,942,203 A * | 8/1999 | Van Disk et al. | 423/359 |
| 5,980,858 A * | 11/1999 | Fujimura et al. | 423/655 |
| 6,066,307 A * | 5/2000 | Keskar et al. | 423/648.1 |
| 6,153,163 A * | 11/2000 | Prasad et al. | 423/246 |
| 6,214,258 B1 * | 4/2001 | Woodward et al. | 252/373 |

FOREIGN PATENT DOCUMENTS

| | | |
|---|---|---|
| EP | 0 458 217 A2 | 11/1991 |
| EP | 0 658 367 A2 | 6/1995 |
| EP | 0 743 088 A2 | 11/1996 |
| EP | 0 747 109 A2 | 12/1996 |
| EP | 0 748 648 A1 | 12/1996 |
| WO | 9741060 | 11/1997 |

* cited by examiner

*Primary Examiner*—Wayne Langel
*Assistant Examiner*—Timothy C Vanoy
(74) *Attorney, Agent, or Firm*—Wenderoth, Lind & Ponack, L.L.P.

(57) ABSTRACT

A method is provided for performing catalytic or non-catalytic processes which uses oxygen supplied from the permeate side of a mixed oxygen ion and electron conducting membrane by means of a sweep gas at an elevated temperature. The sweep gas is formed by burning fuel in a sweep gas preheater. The sweep gas containing oxygen picked up from the membrane is reacted with a hydrocarbon fuel in a catalytic reactor to form a syngas containing nitrogen and hydrogen. The nitrogen and hydrogen containing syngas is worked up into ammonia; the ammonia is burned in an ammonia burner to produce a nitrogen oxides containing gas, and the nitrogen oxides containing gas is used in the production of nitric acid. The process is able to directly transfer the oxygen containing sweep gas to the catalytic reactor, without any intermediate cooling; recompression and reheating.

9 Claims, 1 Drawing Sheet

CATALYTIC OR NON-CATALYTIC PROCESSES WITH ENRICHED OXYGEN AS A REACTANT

The present invention relates to a method for performing catalytic or non-catalytic processes, wherein oxygen is one of the reactants, comprising supply of oxygen from an oxygen containing gas mixture.

In conventional catalytic or non-catalytic processes where oxygen is one of the reactants, the supply of oxygen is usually performed by compressing air which then is treated in an air liquefaction or cryogenic unit. Recovered oxygen is usually compressed and to some extent reheated. In such processes the energy requirement related to the supply of oxygen comprises a substantial part of the total energy consumption of the process. Thus air liquefaction and compression and reheating of the oxygen stream will require large amounts of energy. Further, the equipments required for these process steps are expensive.

In the field of gas separation, several methods are known. A rather new technique is application of membranes made from materials with both ionic and electronic conductivity. Such a membrane can be a mixed oxygen ion and electron conducting membrane, for instance capable of separating oxygen from oxygen containing gaseous mixtures at 400–1300° C. An oxygen partial pressure difference causes oxygen to be transported through the membrane by reduction of oxygen on the high oxygen partial pressure side (the feed side) and oxidation of the oxygen ions to oxygen gas on the low oxygen partial pressure side (the permeate side). In the bulk of the membrane, oxygen ions are transported by a diffusive process. Simultaneously the electrons flow from the permeate side back to the feed side of the membrane.

Application of mixed conducting membranes in separation of gas mixtures is generally known from the patent application EP 0 658 367 A2. This application shows separation of oxygen from air by means of a mixed conducting membrane which is integrated with a gas turbine system. Pure oxygen is recovered from the permeate side of the membrane unit at near atmospheric pressure or below. The oxygen thus has to be cooled to below approx. 50° C. and recompressed to required process pressure before being supplied to the oxidation reactor.

The main objective of the invention was to arrive at improved methods for performing catalytic and non-catalytic processes in which oxygen is one of the reactants.

Another objective was to supply oxygen to said processes in a way that implied reduced energy consumption and investment costs.

A further objective was to utilise existing process streams in obtaining a cheaper oxygen supply to the process.

It was also an objective to apply the basic concept for production of nitric acid.

One problem the inventors faced in their search for a cheaper oxygen supply, was that the basic processes should not be substantially changed. Further, it would be an advantage to be able to utilise existing hot process streams. The inventors therefore started to look for solutions that might meet both these requirements.

The fact that catalytic or non-catalytic processes where oxygen is one of the reactants usually comprise at least one process stream being at elevated temperature would meet one of the requirements for utilising mixed conductive membranes. However, in order to obtain a high separation efficiency and to avoid cooling and recompression of oxygen an applicable sweep gas for the permeate side of the membrane should be available. One requirement was that the application of a sweep gas in said processes should not require supply of any additional reactant or gases and that it should be possible to make the sweep gas without installation of expensive new process equipment.

After having evaluated various ways of supplying oxygen to said catalytic or non-catalytic processes, the inventors decided to further investigate the possibility of applying mixed conductive membranes in spite of the teachings of the above EP-application. It was then found that in the processes in question there would be available various gas streams at elevated temperature making them applicable as sweep gas. Such sweep gas could be other reactants, steam, the products from a catalytic or non-catalytic chemical reaction, or recycled inert gases. Hot compressed air could be fed to a mixed conducting membrane which on the permeate side was exposed to a sweep gas of the above stated type and then picking up oxygen from the membrane unit. The sweep gas thus enriched with oxygen could then be transferred to a reactor for the final production of the desired products.

Application of a sweep gas in combination with a solid electrolyte membrane to lower the oxygen partial pressure to increase the degree of oxygen removal or oxygen recovery is known from the U.S. Pat. No. 5,035,726. In this patent a method for purifying crude argon is disclosed by selective permeation of oxygen through the membrane. Crude argon is compressed and heated and fed to a membrane unit to produce an $O_2$ depleted argon stream. In order to improve the efficiency of gas separation by the membrane, the permeate side of the membrane is swept by available nitrogen supplied from a cryogenic unit.

In the said argon purification process the use of a high temperature heat exchanger is required to produce a sweep gas having a temperature above at least 500° C. and preferably above 600 to 700° C. to not cool the membrane and thus reduce the rate of oxygen transport through the membrane. In rather small process plants, or in the case of low oxygen flows preheating of the sweep gas in a high temperature heat exchanger could be economically feasible, but for recovery of several ton of oxygen per day the use of high temperature heat exchangers to preheat the sweep gas could be very expensive and probably not economical. By applying an available hot process stream as sweep gas the problems associated with the said heating of the sweep gas in the above U.S. patent is avoided.

Application of pure oxygen as an oxidant in the ammonia oxidation process is generally known from U.S. Pat. No. 3,927,182. According to this patent oxygen is supplied from an oxygen plant, e.g. a cryogenic plant, and said oxygen is mixed with recycled tail gas and the thus formed oxygen containing tail gas is compressed in a recycle compressor and is then mixed with evaporated ammonia and the formed gas mixture is fed to an ammonia burner. The main disadvantage of this process is the high energy requirement and the high cost of oxygen.

The present invention will thus in its widest scope comprise a method for performing a catalytic or non-catalytic process wherein oxygen is one of the reactants being supplied from an oxygen containing gas mixture, and where oxygen is picked up from the permeate side of an oxygen ion and electron conducting membrane by means of a sweep gas at elevated temperature and where the thus formed sweep gas is a reactant for the catalytic or non-catalytic oxidation process downstream the membrane unit from here defined as the main reactor.

In said method the sweep gas can be preheated in a catalytic or non-catalytic reactor located upstream the membrane unit by burning of fuel from here defined as a sweep gas preheater.

A further embodiment of the invention comprises that the process gas used as sweep gas is the gas phase product or part of the gas phase product from the main reactor.

Another embodiment of the invention comprises that process gas containing oxygen not utilised in the main reactor is applied as oxidant in the sweep gas preheater.

The process gas used as sweep gas can be steam containing a gas mixture produced by mixing the steam with about stoichiometric amounts of fuel and air. The thus formed mixture can be fed to a sweep gas preheater to increase the temperature of the steam containing sweep gas to between 400 and 1300° C.

The composition and oxygen content of the sweep gas leaving the membrane unit can be regulated to give the desired temperature rise and gas composition of the product leaving the main reactor by regulation of the feed streams to the sweep gas preheater and the amount of oxygen transferred to the permeate side of said membrane unit.

The temperature in the sweep gas preheater can be controlled by addition of a coolant such as steam, water, inert gas or gas mixtures not taking part in the reaction in the main reactor.

The sweep gas having picked up oxygen from the membrane unit can be used in production of syngas for ammonia production by being reacted with a hydrocarbon fuel.

The process gas used as sweep gas is the NO-containing gas leaving the ammonia burner in a nitric acid process and the thus formed oxygen containing gas can be used in the production of nitric acid.

The main product is formed in the sweep gas preheater, and the gas leaving the sweep gas preheater is applied as sweep gas in the membrane unit. The sweep gas containing oxygen is cooled and separated in one product stream and one stream containing oxygen is recycled to the sweep gas preheater as oxidant in said preheater.

The invention will be further explained and envisaged in the examples and corresponding figures.

Figure 1:
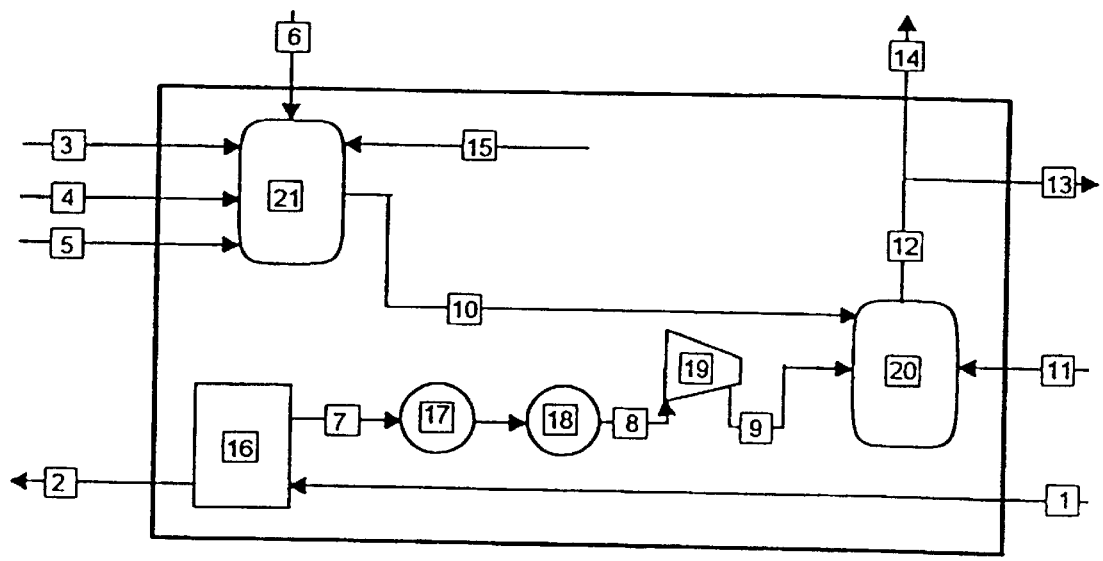
FIG. 1 shows a process comprising supply of oxygen using a mixed conducting membrane instead of conventional oxygen supply units.

FIG. 1 shows a chemical process, which can be catalytic or non-catalytic, or a combination of both, where oxygen is separated from an air stream by means of a mixed conducting membrane 16 at 400 to 1300° C. and where the stream of oxygen is separated from air by means of a method as described in the above referred EP 0 658 367 A2. Thus obtained oxygen is then supplied in a conventional way to the chemical process.

Compressed air stream 1 is fed to a mixed conducting membrane unit 16. Pure oxygen is recovered from the permeate side of the membrane unit 16 at near atmospheric pressure or below. Oxygen depleted air leaves the unit 16 as stream 2. Oxygen stream 7 is then cooled to below approx. 40° C. by first producing steam in heat recovery unit 17 and further by means of cooling water in heat exchanger 18. The oxygen stream 8 is then compressed to required process pressure in compressor 19 comprising one or more stages with intermediate cooling resulting in stream 9 which is fed to unit 20 together with a gas mixture 10 containing one or more reagents. Possibly also a reagent stream 11 is fed to unit 20. The resulting product from unit 20 is stream 12, which can be split such that part thereof is drawn off as streams 13 and 14. Gas mixture 10 could be made in unit 21 by mixing reactant 3, like e.g. natural gas, CO and $H_2$ containing synthesis gas, ammonia, methanol etc. together with e.g. steam (stream 4) or inert gases (stream 5) and possibly also an oxygen containing gas stream 6 or a recycled process stream 15 which could be part of product stream 12. Unit 21 could be a catalytic or non-catalytic reactor or a static gas mixer.

The process as described in FIG. 1 will however require undesired energy consumption in connection with the oxygen supply.

Figure 2:
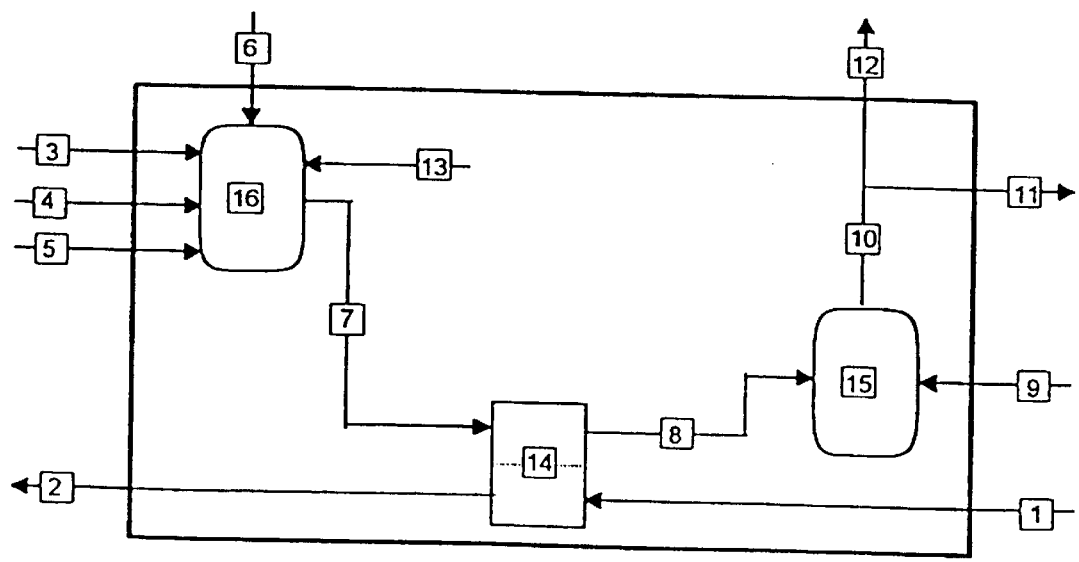
FIG. 2 shows a process comprising supply of oxygen according to the invention.

FIG. 2 shows a chemical process, which can be a catalytic or non-catalytic process, according to the invention and where the oxygen reactant is delivered from a mixed conducting membrane 14 and where a sweep gas is fed to the permeate side of the membrane.

Compressed air stream 1 is fed to a mixed conducting membrane unit 14. To the permeate side of the membrane unit 14 there is supplied a sweep gas stream 7 which picks up oxygen from unit 14 and forms an oxygen containing gas stream 8 which is fed to a chemical reactor unit 15 to which is supplied a reactant stream 9, and giving the resulting product stream 10 which can be split such that part thereof is drawn off as streams 11 and 12. To unit 16 which is a catalytic or non-catalytic reactor a reactant stream 3 is supplied, like e.g. natural gas, a CO and $H_2$ containing gas, ammonia, methanol etc. together with e.g. steam (stream 4) or inert gases (stream 5) and possibly also an oxygen containing gas stream 6 or a recycled process stream 13 which could be part of product stream 10. The product formed in unit 16 is then used as sweep gas in the mixed conducting membrane unit 14. Oxygen depleted air leaves the unit 14 as stream 2. By applying the above described system for supplying oxygen, units 17, 18 and 19 of FIG. 1 will not be necessary resulting in lower investment costs and reduced energy consumption.

EXAMPLE 1

This example shows a chemical process performed in a system of units as described in FIG. 2. Hot compressed air stream 1 at 1–30 bara and 500–1200° C. is fed to the membrane unit to which a sweep gas stream 7 at 1–30 bara and 400–1300° C., produced in the reactor 16, is supplied to the permeate side of the membrane and recovering oxygen therefrom. The reactor 16 can be a catalytic or non-catalytic reactor. The sweep gas, which now contains the oxygen (stream 8), can then be fed to a catalytic or non-catalytic reactor 15 for reaction with reactant 9 producing the desired product of the total process. However, part of the said product can be recycled to the sweep gas producing reactor 16. Then this recycle gas must be cooled and recompressed and its oxygen content being controlled according to that required in the reactor 16.

An alternative configuration of the chemical process according to FIG. 2 comprises that the desired product is produced in unit 16 and that the said product stream 7 (the sweep gas) is supplied to the permeate side of the membrane. The oxygen containing product stream 8 is cooled and separated in one product stream 11 and in one stream 12 containing oxygen. Thus unit 15 is not required. Stream 12 is then recycled by means of a compresesor or fan and the resulting oxygen containing stream 13 is fed to reactor 16 as an oxidant.

EXAMPLE 2

This example shows application of the present invention on supply of oxygen to a syngas process where some nitrogen is acceptable in the syngas. The syngas can be used in ammonia production or in a once through or partly once through methanol or Fisher Tropsch process.

Steam is preheated by mixing steam with hot combusted fuel. The mixture consisting of mainly $H_2O$, $N_2$ and $CO_2$ is used as sweep gas in the membrane unit. Alternatively, air, fuel and steam are mixed and passed over a catalyst to burn the fuel. The composition of the produced sweep gas could be as shown in the following table. The composition of the gas leaving the membrane unit (exit membrane) is also shown. The compositions are stated as volume %.

| Component | Sweep gas % | Exit Membrane % |
|---|---|---|
| $CO_2$ | 2.0 | 1.85 |
| $N_2$ | 16.2 | 15.00 |
| $O_2$ | 0.50 | 7.87 |
| Argon | 0.20 | 0.19 |
| $H_2O$ | 81.20 | 75.09 |
| Temperature, ° C. | 800 | 800 |
| Pressure, bara | 30 | 29.5 |

This example shows that the gas leaving the membrane unit has picked up enough oxygen (7.87 vol. %) for the production of syngas by burning this gas with a hydrocarbon feed. In e.g. production of ammonia the ratio between $N_2$ and $O_2$ in the sweep gas is regulated to give the desired ratio of $H_2$ and $N_2$ in the final syngas product.

EXAMPLE 3

This example shows application of the present invention on supply of oxygen to a closed loop nitric acid process. The supply of oxygen in the present invention comprises application of the product gas leaving the ammonia burner as a sweep gas to pick up oxygen from the permeate side of a mixed conducting membrane. As in the above referred U.S. Pat. No. 3,927,182, the main part of the tail gas is recycled, but according to the present invention recycled tailgas contains at least 15% oxygen and is applied as an oxidant in the ammonia burner. Compared to conventional methods for supplying oxygen to a closed loop nitric acid process the present invention will reduce the energy requirement because recompression of the oxygen stream is no longer required.

By the present invention the inventors have arrived at a flexible process which compared to conventional processes promises lower investment and better utilisation of energy. This is obtained by application of a sweep gas for the permeate side of a mixed conductive membrane and where the sweep gas is made up of available hot process streams. Thus the application of a sweep gas in said processes does not require supply of additional gases or any additional supply of fuel or energy. The described application of mixed conductive membranes can in principle be used in the same way for several types of processes. Since the oxygen enriched sweep gas is leaving the mixed conducting membrane unit 16 of FIG. 1 at elevated pressure and temperature it can be transferred directly to a reactor for the final production of the desired products without intermediate cooling, recompression and reheating, thus saving large compressors like unit 16 and heat exchangers like units 19 and 15 of FIG. 1.

What is claimed is:

1. A method for performing a catalytic or a non-catalytic process in a main reactor wherein oxygen is one of the reactants, comprising:

separating oxygen from an oxygen containing gas mixture in a mixed oxygen ion- and electron conducting membrane unit connected to said main reactor for passing a gas stream, said main reactor located downstream of said membrane unit;

picking up oxygen from a permeate side of said membrane unit by means of a hot sweep gas generated and preheated in a catalytic- or non-catalytic sweep gas reactor located upstream of said membrane unit, and directly transferring the oxygen containing sweep gas leaving said membrane unit at an elevated temperature and pressure, without intermediate cooling, recompression and reheating, to said main reactor.

2. A method according to claim 1, wherein the sweep gas generated in said sweep gas reactor is formed by burning a fuel with a gas phase product or part of a gas phase product generated by said main reactor located downstream of said membrane unit.

3. A method according to claim 2, wherein the gas phase product or part of the gas phase product from said main reactor located downstream of said membrane unit contains oxygen not utilized in said main reactor which is recycled for use as an oxidant in said sweep gas reactor.

4. A method according to claim 1, wherein the sweep gas generated in said sweep gas reactor is a steam containing gas formed by reacting steam with about stoichiometric amounts of fuel and air.

5. A method according to claim 1, wherein the composition and oxygen content of the oxygen containing sweep gas leaving said membrane unit is regulated to give a desired temperature rise and gas composition of a product stream generated by said main reactor, by regulation of feed streams into said sweep gas reactor and by regulation of the amount of oxygen transferred to the permeate side of said membrane unit.

6. A method according to claim 1, wherein the temperature rise in said sweep gas reactor is controlled by addition of a coolant not taking part in the reaction in said sweep gas reactor.

7. A method according to claim 1, wherein the sweep gas containing oxygen picked up from said membrane unit is used in the production of syngas for ammonia formation by reacting the sweep gas with a hydrocarbon fuel in said main reactor.

8. A method according to claim 1, wherein a main product is formed in said sweep gas reactor, the gas leaving said sweep gas reactor is applied as sweep gas in said membrane unit, the sweep gas containing oxygen is converted in the main reactor into in one product stream and one stream containing oxygen, the product stream is cooled, and the stream containing oxygen is recycled to said sweep gas reactor as an oxidant.

9. A method according to claim 1, wherein the sweep gas is reacted with a hydrocarbon fuel in the main reactor to form a nitrogen and hydrogen-containing syngas product;

the nitrogen and hydrogen-containing syngas product is used to produce ammonia;

the ammonia is transferred to an ammonia burner, where it is combusted to form a NO-containing gas, and the NO-containing gas is used to produce nitric acid in a nitric acid production plant.

* * * * *